(12) United States Patent
Cavazza et al.

(10) Patent No.: US 11,629,013 B2
(45) Date of Patent: Apr. 18, 2023

(54) METHOD AND DEVICE FOR PERFORMING OPERATIONS ON ITEMS TRANSPORTED ALONG A MANUFACTURING LINE

(71) Applicant: Azionaria Costruzioni Macchine Automatiche A.C.M.A. S.p.A., Bologna (IT)

(72) Inventors: Luca Cavazza, Bologna (IT); Stefano Sinigardi, Bologna (IT); Enrico Campagnoli, Bologna (IT); Luca Cerati, Bologna (IT); Andrea Biondi, Bologna (IT)

(73) Assignee: Azionaria Costruzioni Macchine Automatiche A.C.M.A, Bologna (IT)

( * ) Notice: Subject to any disclaimer, the term of this patent is extended or adjusted under 35 U.S.C. 154(b) by 0 days.

(21) Appl. No.: 17/752,616

(22) Filed: May 24, 2022

(65) Prior Publication Data
US 2022/0380138 A1    Dec. 1, 2022

(30) Foreign Application Priority Data
May 25, 2021    (IT) .......................... 102021000013556

(51) Int. Cl.
*B65G 47/24*    (2006.01)
*B65B 35/58*    (2006.01)
(Continued)

(52) U.S. Cl.
CPC .............. *B65G 47/24* (2013.01); *B65B 35/58* (2013.01); *B65G 43/08* (2013.01); *B65G 47/902* (2013.01);
(Continued)

(58) Field of Classification Search
CPC ...... B65G 47/32; B65G 47/22; B65G 47/244; B65G 47/24; B65G 43/08; B65G 47/902;
(Continued)

(56) References Cited

U.S. PATENT DOCUMENTS 3,851,751 A * 12/1974 Jones ...................... B65B 43/30
198/803.5
5,647,190 A *  7/1997 Minarelli ................ B65B 17/02
198/474.1
(Continued)

FOREIGN PATENT DOCUMENTS

DE    102006020518 A1    11/2007
EP       0960818 B1    12/1999
(Continued)

OTHER PUBLICATIONS

Search Report issued in Italian Patent Application No. 202100013556; dated Feb. 2, 2022; 10 pages.

*Primary Examiner* — James R Bidwell
(74) *Attorney, Agent, or Firm* — Dilworth IP, LLC

(57) ABSTRACT

A method for performing operations on items (A) transported along a manufacturing line including feeding a sequence of items (A) with respective resting portions along a first feed path onto a first transport surface, arranging a gripping assembly having a first gripping head and a second gripping head, picking up a first item (A) from the first feed path using the first gripping head, rotating the first item (A) around a first rotation axis (R1), performing at least one operation on the item (A) during the rotation thereof around the first rotation axis (R1), swapping the positions of the first gripping head and the second gripping head, resting the first item (A) on a second transport surface and releasing the first item (A), and picking up a further item (A) from the first feed path using the second gripping head.

21 Claims, 4 Drawing Sheets

(51) Int. Cl.
*B65G 43/08* (2006.01)
*B65G 47/90* (2006.01)
*B65G 47/91* (2006.01)

(52) U.S. Cl.
CPC ........ *B65G 47/91* (2013.01); *B65G 2203/041* (2013.01); *B65G 2203/044* (2013.01); *B65G 2811/0626* (2013.01)

(58) Field of Classification Search
CPC ............ B65G 47/91; B65G 2811/0626; B65G 2203/044; B65G 2203/041; B65B 35/58
USPC ...................................... 198/414, 471.1, 456
See application file for complete search history.

(56) References Cited

U.S. PATENT DOCUMENTS

| | | | | |
|---|---|---|---|---|
| 5,921,375 | A * | 7/1999 | van Laar | B65G 47/848 |
| | | | | 198/468.4 |
| 6,170,636 | B1 * | 1/2001 | Een | B65H 39/14 |
| | | | | 198/441 |
| 6,651,800 | B2 * | 11/2003 | Baclija | B65G 47/848 |
| | | | | 198/395 |
| 6,742,981 | B2 * | 6/2004 | Harada | H01L 21/687 |
| | | | | 414/223.01 |
| 2002/0110448 | A1 | 8/2002 | Baclija et al. | |
| 2013/0126306 | A1 | 5/2013 | Rack et al. | |
| 2020/0079596 | A1 | 3/2020 | Frank et al. | |
| 2021/0229847 | A1 * | 7/2021 | Kalany | B65B 5/105 |

FOREIGN PATENT DOCUMENTS

| | | |
|---|---|---|
| EP | 1983897 B1 | 10/2008 |
| EP | 1984255 B1 | 10/2008 |
| EP | 2920095 B1 | 9/2015 |
| EP | 3187424 B1 | 12/2017 |
| EP | 3263494 B1 | 8/2019 |
| EP | 3753876 A1 | 12/2020 |
| EP | 3822181 A1 | 5/2021 |
| GB | 2220187 B | 2/1992 |
| JP | S55125869 A | 9/1980 |

* cited by examiner

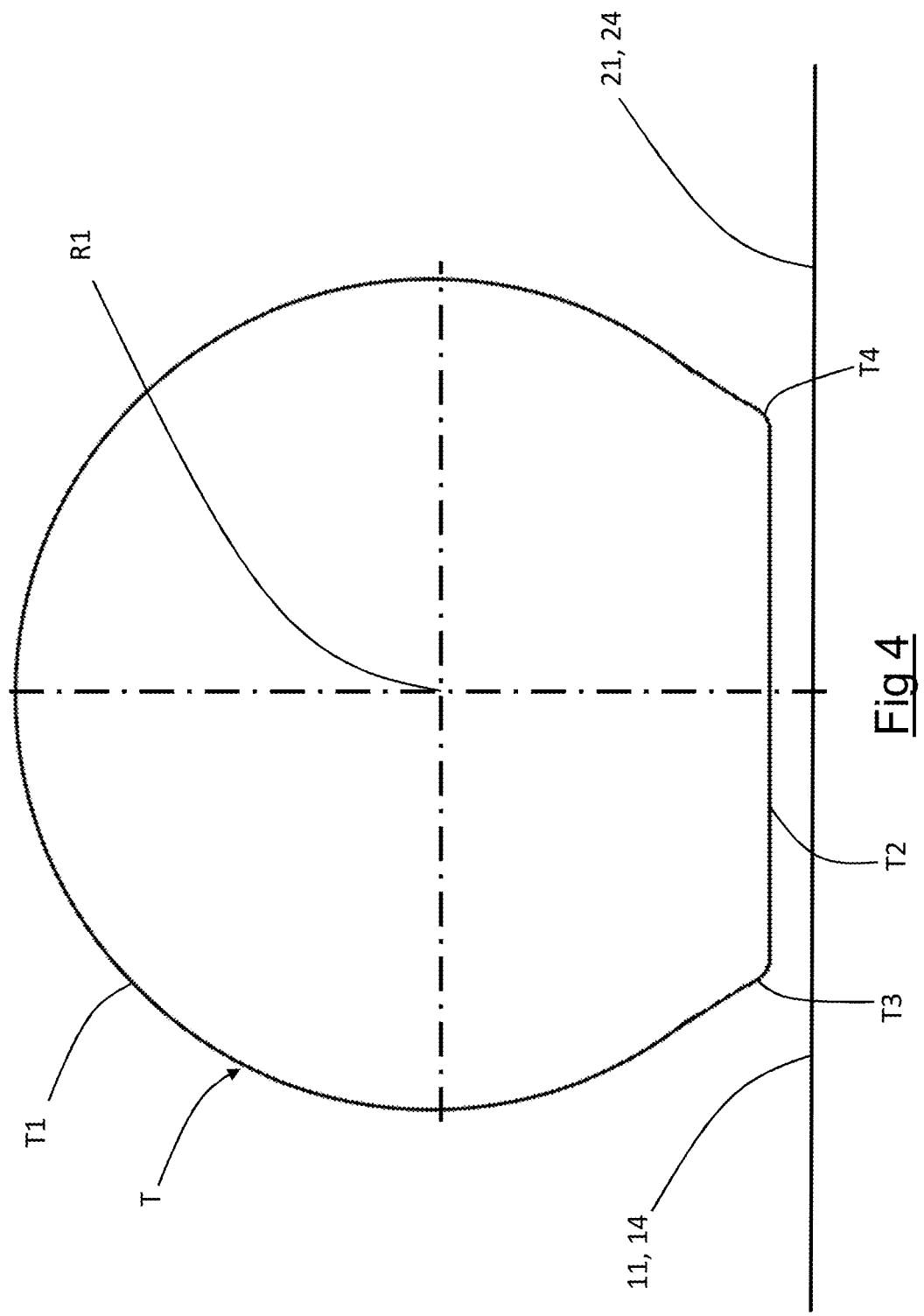

METHOD AND DEVICE FOR PERFORMING OPERATIONS ON ITEMS TRANSPORTED ALONG A MANUFACTURING LINE

FIELD OF THE INVENTION

The present invention relates to a method and a device for performing operations on items transported along a manufacturing line.

BACKGROUND

The present invention preferably relates to a method and a device for performing operations on food items, such as chocolates, pralines, small sweets possibly coated with a layer of sugar, butter or otherwise, or similar food products, preferably small-sized, semi-finished or finished, transported along a manufacturing line.

In a manufacturing line, items are subjected to a plurality of operations or are produced by performing a plurality of operations usually carried out by a plurality of operating stations following one another along the manufacturing line.

The operating stations of the manufacturing line are arranged inside production plants according to a carefully designed layout to minimise the space required by the manufacturing line and to maximise production efficiency and speed.

Two functionally adjacent operating stations are very often connected to each other by conveyor belts that transport items from one operating station to the next operating station of the manufacturing line.

The items can be laid resting on the conveyor belts, possibly housed in special seats obtained on the conveyor belts, and arranged in ordered rows.

The positioning and the path followed by the conveyor belts are also carefully designed to minimise the space required by the manufacturing line and to maximise efficiency and production speed.

SUMMARY

The Applicant has perceived that it might be necessary to perform further operations on the items than the operations already planned and carried out in the operating stations.

In fact, the Applicant has noted that items produced along a manufacturing line might, for various reasons, require specifications not initially provided or in any case additional to the initial specifications.

For example, the Applicant has found that an item might require a dimensional check, and/or a surface appearance check, and/or a surface colour check not initially provided, or in combination it might require the addition of a component not initially provided.

The Applicant has verified that these needs may require redesigning the layout of the manufacturing line in order to include a new operating station configured to perform the required new operation.

However, the Applicant has verified that redesigning the layout of the manufacturing line is not always possible, for example due to the redesign costs and time or for example due to a lack of space within the production plant.

The Applicant has therefore realised that it would be advantageous to include the new operating station so as to operate on a conveyor interposed between two already existing operating stations, so that the new station can perform operations on the items during their transport without having to significantly modify the existing manufacturing line.

The Applicant has verified that it would be possible, for example, to place one or more cameras along a transport line to perform inspections directly on the items during their transport.

The Applicant has, however, verified that in some situations it is not possible to operate directly on the items transported along a transport line.

In particular, the Applicant has verified that some of the further operations may require access to portions of the items that are not directly accessible during transport.

For example, the Applicant has verified that it would not be possible to directly perform an inspection of the portion of the items resting on a conveyor.

The Applicant has therefore felt the need to perform further operations on items transported sequentially along a manufacturing line even if the portions of the items on which these further operations are to be performed are not directly accessible during their transport.

The present invention therefore concerns, in a first aspect thereof, a method for performing operations on items transported along a manufacturing line.

Preferably, it is provided feeding a sequence of items along a first feed path with respective resting portions of the items resting on a first transport surface.

Preferably, it is provided arranging a plurality of gripping assemblies arranged along a circumferential direction and rotatable along said circumferential direction about a first common rotation axis.

Preferably, each gripping assembly comprising a first gripping head and a second gripping head;

Preferably, it is provided picking up a first item from the first feed path through a picking portion which is different from the resting portion using the first gripping head.

Preferably, it is provided rotating the first item around the first rotation axis.

Preferably, it is provided performing at least one operation on the item during the rotation thereof around the first rotation axis.

Preferably, it is provided swapping the positions of the first gripping head and the second gripping head.

Preferably, it is provided resting the resting portion of the first item on a second transport surface and releasing the first item from the first gripping head.

Preferably, it is provided picking up a further item from the first feed path through a picking portion which is different from the resting portion using the second gripping head.

In a second aspect thereof, the present invention concerns a device for performing operations on items transported along a manufacturing line.

Preferably, a picking station and a release station are provided.

Preferably, there is provided a plurality of gripping assemblies arranged along a circumferential direction and rotatable along said circumferential direction about a first common rotation axis.

Preferably, each gripping assembly comprises a first gripping head and a second gripping head each configured to pick up a respective item from the picking station and to release the item in the release station.

Preferably, the first gripping head is rotatable about the first rotation axis between the picking station and the release station and between the release station and the picking station.

Preferably, the second gripping head is rotatable about the first rotation axis between the picking station and the release station and between the release station and the picking station.

Preferably, when the first gripping head is in the picking station the second gripping head is in the release station and when the first gripping head is in the release station the second gripping head is in the picking station.

The expression "swapping the positions of the first gripping head and the second gripping head" means: bringing, in a first time interval between an initial instant and a final instant, the first gripping head from a first position to a second position and, at the same time, bringing, in the same first time interval, the second gripping head from a third position to a fourth position, wherein the first position coincides with the position occupied by the first gripping head in the initial instant the third position coincides with the position occupied by the second gripping head in the initial instant, the second position coincides with the position that would be occupied by the second gripping head in the final instant if the second gripping head were not brought to the fourth position, the fourth position coincides with the position that would be occupied by the first gripping head in the final instant if the first gripping head were not brought to the second position.

The Applicant believes that by picking up an item from a first feed path, for example from a first transport surface of a conveyor belt connecting two successive operating stations, by means of a gripping head, it is possible to engage the item at its own picking portion which is different from the portion that is resting on the conveyor belt and it is thus possible to expose the part of the item that is not directly accessible during the transport thereof along the first feed path. By rotating the gripping head around a rotation axis substantially perpendicular to the feed path, it is possible to bring the item to an operating station (possibly additional with respect to the initially provided operating stations) which can operate on the portion of the item exposed by the gripping head.

The Applicant further believes that by equipping the gripping assembly with a further gripping head and by swapping the positions of the two gripping heads during rotation about the aforesaid rotation axis, it is possible to pick up an item from the first feed path with one of the two gripping heads and, at the same time, deposit an item already picked up and subjected to the operations of the operating station onto a second feed path with the other gripping head. By arranging the two feed paths parallel to each other, on the second feed path it is thus possible to deposit the items picked up from the first feed path onto the second feed path in the same order as they were picked up from the first feed path and with the same orientation (i.e. with the same portion of the resting item), ensuring continuity of transport and orientation for the items.

The Applicant found that this allows performing operations on items transported sequentially along a manufacturing line, without altering the transport sequence and without significantly modifying the manufacturing line even if the portions of items on which operations are to be performed are not directly accessible during their transport along the manufacturing line.

The present invention may comprise, in one or both of the aspects discussed above, at least one of the preferred features described below.

Preferably, the picking station is located along a first feed path.

Preferably, the release station is along a second feed path.

Preferably, the first gripping head and the second gripping head of the same gripping assembly do not operate simultaneously on the same item.

Preferably, the first rotation axis is perpendicular to the first item feed path.

Preferably, releasing the first item from the first gripping head and picking up a further item from the first feed path through a different picking portion from the resting portion using the second gripping head occur simultaneously.

The Applicant has found that picking up an item from the first feed path with one of the two gripping heads and, at the same time, depositing an item already picked up and subjected to the operations of the operating station onto a second feed path allows obtaining a perfect transport continuity of the items between operating stations (for example between two original operating stations).

Preferably, when the first gripping head is in the picking station the second gripping head is in the release station and when the first gripping head is in the release station the second gripping head is in the picking station.

The items can thus be picked up and released simultaneously in contiguous spatial regions.

The picking and the release of the items is preferably carried out by pneumatic members configured to exert a suction action on the picking portion of the items.

Preferably, each first and second gripping head comprises a pneumatic member configured to exert a pneumatic suction action on the gripping portion aimed at retaining an item against the gripping head in a controlled manner.

Preferably, between picking up the first item from the first feed path and releasing the first item from the first gripping head, the first item is rotated around the first rotation axis by an angle between 350° and 360°.

In this way, the first item substantially describes a complete or nearly complete circumference and can be released on a second transport surface that is substantially parallel and aligned to the first transport surface.

Preferably, it is provided distancing the first item from the first transport surface after picking up the first item from the first feed path.

Preferably, swapping the positions of the first gripping head and the second gripping head is actuated after distancing the first item from the first transport surface and before resting the resting portion of the first item on a second transport surface.

In this way, the item is distanced from both the first and second transport surfaces while swapping the positions between the gripping heads, eliminating the risk of the item hitting either of the two transport surfaces.

Preferably, each first gripping head and each second gripping head move along a transport trajectory whose projection on a plane perpendicular to the first rotation axis comprises an arc-shaped portion and at least one substantially straight portion.

Preferably, rotating the first item around a first rotation axis comprises moving the first item along a transport trajectory whose projection on a plane perpendicular to the first rotation axis comprises an arc-shaped portion and at least a substantially straight portion.

Preferably the substantially straight portion is parallel to the second transport surface.

Preferably, said picking station and said release station are located along said substantially straight portion of the transport trajectory.

Preferably, picking up a first item from the first feed path is actuated when the first gripping head (or second gripping head) travels said substantially straight portion of the transport trajectory.

In this way, the item, transported along the first transport surface, travels a trajectory that is substantially parallel to the first gripping head (or the second gripping head) when it is picked up by it.

This allows to have available a time interval of adequate amplitude (i.e. greater than a single instant) to gradually pick up the item from the first transport surface. In this way, it can be avoided subjecting the item to high stresses while picking it up, preserving the integrity thereof.

Preferably, when the item is moves along the first transport surface at the substantially straight portion of the transport trajectory, the item is placed at a distance from a first gripping head (or from a second gripping head), which travels the substantially straight portion of the transport trajectory, between 0.01 centimetres and 2 centimetres, more preferably between 0.1 centimetres and 1 centimetre.

Preferably, when the first gripping head and the second gripping head travel the substantially straight portion of the transport trajectory, the component of the speed vector of the first gripping head and of the second gripping head is equal to the speed of the first transport surface.

This makes it possible to avoid relative slippage between the item and the gripping head when the item is picked up from the first transport surface, thus avoiding damage to the item when it is picked up.

Preferably, resting the resting portion of the first item on the second transport surface and releasing the first item from the first gripping head are actuated when the first item travels said substantially straight portion of the transport trajectory.

In this way, the item travels a trajectory that is substantially parallel (and not merely tangent) to the second transport surface when it is released onto it.

This allows to obtain a time interval of adequate magnitude (i.e. greater than a single instant) to gradually release the item on the second transport surface. In this way, it can be avoided subjecting the item to high stresses while releasing it, preserving the integrity thereof.

Preferably, when the item moves along the substantially straight portion of the transport trajectory, the item is placed at a distance between 0.01 centimetres and 2 centimetres, more preferably between 0.1 centimetres and 1 centimetre, from the second transport surface.

Preferably, when the first item travels the substantially straight portion of the transport trajectory, the component of the speed vector of the first item in the direction parallel to the substantially straight portion of the transport trajectory is equal to the speed of the second transport surface.

This makes it possible to avoid relative slippage between the item and the second transport surface when the item is released onto the second transport surface, thus avoiding damage to the item when it is released.

Preferably, when the first item travels the substantially straight portion of the transport trajectory, the component of the acceleration vector of the first item in the direction parallel to the substantially straight portion of the transport trajectory is substantially zero.

Preferably, each first gripping head and each second gripping head are movably mounted on the respective gripping assembly to exchange the position of the first gripping head with the second gripping head and the position of the second gripping head with the first gripping head during the rotation of the gripping assembly around the first rotation axis.

Preferably, each first gripping head and each second gripping head are rotatably mounted, around a second rotation axis which is different from the first rotation axis, on the respective gripping assembly.

Preferably, swapping the positions of the first gripping head and the second gripping head comprises simultaneously rotating the first gripping head and the second gripping head around a second rotation axis which is different from the first rotation axis.

Preferably, the second rotation axis is perpendicular to the first rotation axis.

Preferably, simultaneously rotating the first gripping head and the second gripping head around a second rotation axis occurs during the rotation of the first item around the first rotation axis.

Preferably, there is at least provided one operating station configured to perform at least one operation on an item transported by the first gripping head and the second gripping head; said at least one operating station being located between the picking station and the release station.

Preferably, performing at least one operation on the item during the rotation thereof around the first rotation axis comprises performing at least one operation on the resting portion of the item.

Preferably, performing an operation on the item comprises performing a visual inspection of the surface of the resting portion of the item.

Preferably, the operating station comprises one or more imaging devices.

The operating station can be configured to operate on the resting portion of the item between a first point and a second point of the arc-shaped portion of the trajectory of the item or to operate substantially at one point of the arc-shaped portion of the trajectory of the item.

Rotation around the first rotation axis of the item disengages the resting portion from the first transport surface and makes it accessible for this operation.

Preferably, when the first gripping head is in the picking station, the first gripping head is placed at a first distance from the second gripping head along a direction parallel to the first rotation axis, and when the second gripping head is in the picking station, the first gripping head is placed at said first distance from the second gripping head along a direction parallel to the first rotation axis.

The two gripping heads can thus be used interchangeably to pick up and deposit the items.

Preferably, for a 360° rotation of a gripping assembly around the first rotation axis, the first gripping head moves between the picking station and the release station and the second gripping head moves between the release station and the picking station, or the first gripping head moves between the release station and the picking station and the second gripping head moves between the picking station and the release station.

Preferably, first activation members of the first gripping head are provided that are switchable between a picking condition in which the first gripping head retains an item and a release condition in which the first gripping head does not retain an item.

Preferably, second activation members of the second gripping head are provided that are switchable between a picking condition in which the second gripping head retains an item and a release condition in which the second gripping head does not retain an item.

Preferably, a support frame rotatable around said first rotation axis is provided; said gripping assemblies being mounted on said support frame to rotate around said first rotation axis.

Preferably, an articulation arm is provided for each gripping assembly.

Preferably, each articulation arm has a first end hinged to said frame around a first articulation axis parallel to said first rotation axis and a second end hinged to the respective gripping assembly around a third articulation axis parallel to said first articulation axis.

Preferably, said articulation arm rotates in a first angular direction with respect to the support frame and said gripping assembly rotates in a second angular direction, opposite to the first angular direction, with respect to said articulation arm in order to realize said straight portion of the transport trajectory of the first gripping head and of the second gripping head.

Preferably, each first gripping head and each second gripping head are rotatably mounted, around a second rotation axis perpendicular to the first rotation axis, on the respective gripping assembly.

BRIEF DESCRIPTION OF THE DRAWINGS

Further characteristics and advantages of the present invention will become clearer from the following detailed description of a preferred embodiment thereof, with reference to the appended drawings and provided by way of indicative and non-limiting example, in which:

FIG. 4 is a schematic representation of a transport trajectory of an item picked up by the device of FIG. 1.

DETAILED DESCRIPTION

Figure 1:
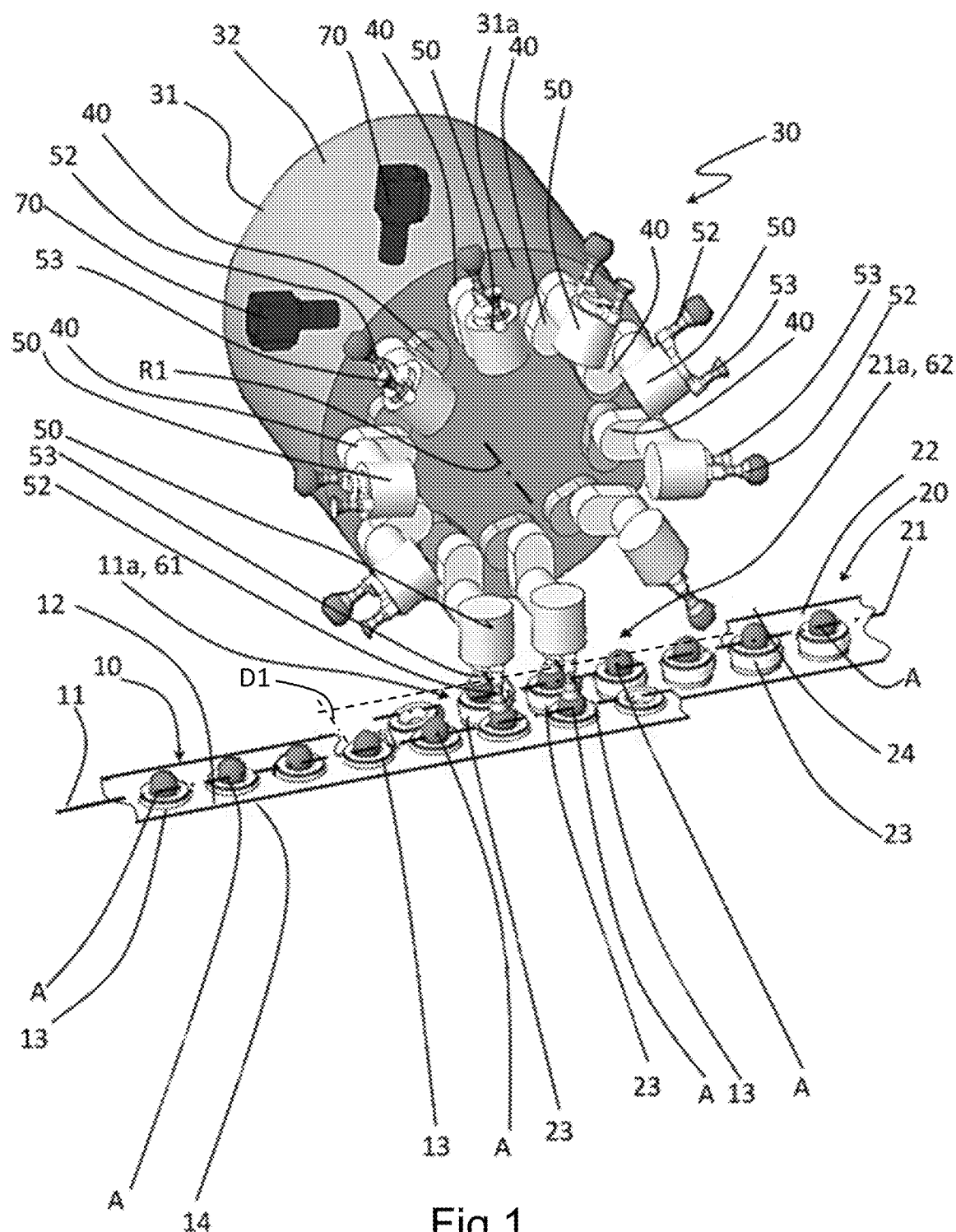
FIG. 1 is a perspective view of a device for performing operations on items transported along a manufacturing line in accordance with the present invention.

A device for performing operations on items A transported along a manufacturing line in accordance with the present invention has been indicated by reference numeral 30.

The items A have been illustrated as solids having a substantially flat surface from which a curved surface of hemispherical or spherical shape develops. However, the items A may have different shapes, for example rectangular-based truncated conical shape, cubic shape or other prismatic shape, or they may have an irregular shape. The items A were all illustrated equal to each other. In embodiments not illustrated, the items A may have different shapes from each other.

FIG. 1 illustrates a portion of an item manufacturing line preferably placed between two operating stations of the manufacturing line (not illustrated) configured to perform operations related to making or packaging items. For example, the manufacturing line portion is arranged, with respect to the direction of movement of the items along the manufacturing line, downstream of a first operating station that makes items and upstream of a second operating station for packaging the items.

A first feed member 10 is configured to feed a sequence of items A along a first feed path 11 from an initial station (not illustrated) to a final station 11a. Preferably, the initial station is arranged at the first operating station and is configured to receive the items A leaving said operating station. Preferably, the final station 11a is located between the first operating station and the second operating station. The final station 11a is located at the device 30.

The first feed member 10 comprises a first conveyor 12 extended from the initial station to the final station 11a and provided with a plurality of first transport seats 13 for movable items along the first feed path 11. The first transport seats 13 have been illustrated as seats having respective resting bases adapted to accommodate the item A so as to support them during transport. In other embodiments not illustrated, the first transport seats 13 may comprise vertical walls integral with the first conveyor 12 that separate the items A from each other by pushing them one by one.

Each item A can be positioned in a respective first transport seat 13 so as to have a respective resting portion that is at least partially in contact with the first conveyor 12. Preferably, the first transport seats 13 are equally spaced from each other and follow one another along the first feed path 11. The place of the points on which the items A rest during their transport along the first feed member 10 defines a first transport surface 14 of the items A, preferably lying in a substantially horizontal plane at least at the final station 11a. The first transport surface 14 may coincide with an upper surface of the first conveyor 12 or with the resting bases of the first transport seats 13 (in the case where, like in the example illustrated, these resting bases do not coincide with the upper surface of the first conveyor 12).

A second feed member 20 is configured to feed a sequence of items along a second feed path 21 from an initial station 21a to a final station (not illustrated). Preferably, the second feed path 21 is parallel to the first feed path 11 and is flanked, at its own initial section, to a final section of the first feed path 21. The first feed path 11 is spaced from the second feed path 21 by a first distance D1. The initial station 21a of the second feed member 20 is located at the device 30. The initial station 21a of the second feed member 20 is placed in proximity to the final station 11a of the first feed member 10, preferably flanked thereto, and is configured to receive items A. Preferably, the final station of the second feed path 21 is placed at the second operating station.

The second feed member 20 comprises a second conveyor 22 extended from the initial station 21a to the final station and provided with a plurality of second transport seats 23 for movable items along the second feed path 21. The second transport seats 23 have been illustrated as seats having respective resting bases adapted to accommodate the item A so as to support them during transport. In other embodiments not illustrated, the second transport seats 23 may comprise vertical walls integral with the second conveyor 22 that separate the items A from each other by pushing them one by one. Preferably, the second seats 23 are equally spaced from each other and follow one another along the second feed path 21. Preferably, the first transport seats 13 and the second transport seats 23 are similar or identical to each other. The place of the points on which the items A rest during their transport on the second feed member 20 defines a second transport surface 24 of the items A, preferably lying in a substantially horizontal plane at least at the initial station 21a. The second transport surface 24 may coincide with an upper surface of the second conveyor 22 or with the resting bases of the second transport seats 23 (in the case where, like in the example illustrated, these resting bases do not coincide with the upper surface of the second conveyor 22).

As mentioned, the device 30 is placed at the final station 11a of the first feed member 10 and of the initial station 21a of the second feed member 20.

The device 30 comprises a support frame 31 rotatable around a first rotation axis R1 perpendicular to the first feed path 11 and to the second feed path 21. The support frame 31 may for example be connected to a baseplate (not illustrated) to rotate around the first rotation axis R1 with respect thereto.

In the embodiment illustrated, the support frame 31 is placed above the first feed path 11 and the second feed path 21 with the first rotation axis R1 parallel to a (preferably horizontal) lying plane of the first feed path 11 and/or of the second feed path 21.

The support frame 31 comprises a drum 32 developed around the first rotation axis R1. The drum 32 is preferably a box-like body containing mechanical and pneumatic components.

Figure 2:
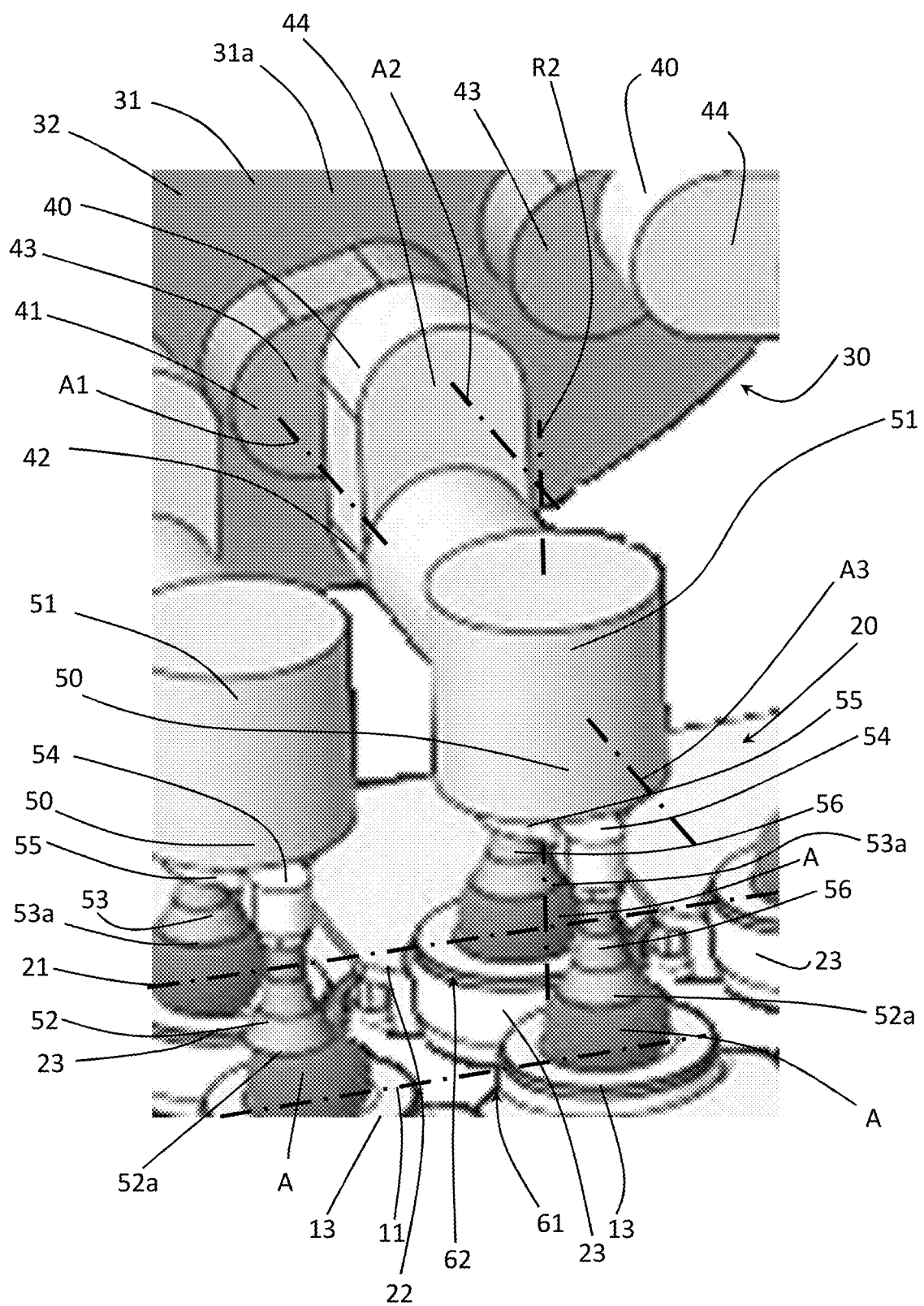
FIG. 2 is a perspective view of an embodiment detail of the device of FIG. 1.

The device 30 comprises a plurality of articulation arms 40 connected to the support frame 31, illustrated in detail in FIG. 2. Preferably, the articulation arms 40 are arranged on a surface 31a of the support frame 31 perpendicular to the first rotation axis R1.

The articulation arms 40 are rotatably mounted on the support frame 31 to be able to rotate around a first articulation axis A1. The first articulation axis A1 is parallel to the first rotation axis R1. The rotational motion of the articulation arms 40 around the first articulation axis A1 may be kinematically constrained to the rotational motion of the support frame 31 around the first rotation axis R1, or it may be kinematically disengaged therefrom, for example obtained with a dedicated electric motor (not illustrated), whose actuation is coordinated with the rotational motion of the support frame 31 around the first rotation axis R1.

Each articulation arm 40 extends from a first end 41 hinged to the support frame 31 around the first articulation axis A1 to a second end 42. The first ends 41 of the articulation arms 40 are connected to the support frame 31 equally spaced from each other according to a circumferential distribution with respect to the first rotation axis R1. The first articulation axes A1 are equidistant from the first rotation axis R1.

Each articulation arm 40 comprises a first connecting rod 43 and a second connecting rod 44 that are hinged together. The first connecting rod 43 extends from the first end 41 of the articulation arm 40 along a direction perpendicular to the first rotation axis R1. The second connecting rod 44 is hinged to the first connecting rod 43 around a second articulation axis A2 parallel to and not coincident with the first articulation axis A1. The second connecting rod 44 extends along a direction perpendicular to the first rotation axis R1 up to the second end 42 of the articulation arm 40.

Each second connecting rod 44 is rotatable with respect to the respective first connecting rod 43 around the second rotation axis A2. The rotational motion of each second connecting rod 44 with respect to the respective first connecting rod 43 may be kinematically constrained and coordinated with the rotational motion of the support frame 31 around the first rotation axis R1, or it may be kinematically disengaged therefrom, for example obtained with a dedicated electric motor (not illustrated), whose actuation is coordinated with the rotational motion of the support frame 31 around the first rotation axis R1.

A rotation of the first connecting rod 43 around the first articulation axis A1 allows to bring the second articulation axis A2 closer to or further away (depending on the direction of rotation) from the first rotation axis R1. In other words, a rotation of the first connecting rod 43 around the first articulation axis A1 allows the distance of the second end 42 of the articulation arm 40 from the first rotation axis R1 to be adjusted.

A plurality of gripping assemblies 50, illustrated in detail in FIG. 2, are connected to the support frame 31. The gripping assemblies 50 are connected to support frame 31 by means of the articulation arms 40. Specifically, each gripping assembly 50 is hinged to a respective articulation arm 40 at the second end 42. Each gripping assembly 50 is rotatable around a respective third articulation axis A3 parallel to and not coincident with the first articulation axis A1. Each gripping assembly 50 is rotatably mounted, around the respective third articulation axis A3, on the second connecting rod 44 of a respective articulation arm 40. Preferably, each gripping assembly 50 comprises a support body 51 hinged to the respective articulation arm 40 and extending away from the articulation arm 40 in a direction parallel to the first rotation axis R1.

The rotational motion of the gripping assemblies 50 around the third articulation axes A3 may be kinematically constrained and coordinated with the rotational motion of the support frame 31 around the first rotation axis R1, or it may be kinematically constrained and coordinated with the rotational motion of the articulation arms 40 around the first articulation axes A1, or it may be kinematically constrained and coordinated with the rotational motion of the second connecting rods 44 with respect to the first connecting rods 43 around the second articulation axes A2, or it may be obtained with a dedicated electric motor (not illustrated), whose operation is coordinated with the rotational motion of the support frame 31 around the first rotation axis R1 or with the rotational motion of the articulation arms 40 around the first articulation axes A1 or with the rotational motion of the second connecting rods 44 with respect to the first connecting rods 43.

A first gripping head 52 and a second gripping head 53 configured to pick up, retain and release an item A, are connected to each gripping assembly 50. The first gripping head 52 and the second gripping head 53 are rotatably mounted on the respective gripping assembly 50 around a second rotation axis R2 perpendicular to the first rotation axis R1. The first gripping head 52 and the second gripping head 53 are spaced from each other on the respective gripping assembly 50 by a distance that substantially coincides with the first distance D1 that separates the first transport direction 11 from the second transport direction 14.

Preferably, each first 52 and second gripping head 53 of the same gripping assembly 50 are part of a fork-like body 54 hinged to the gripping assembly 50 and rotatable around the second rotation axis R2. The fork-like body 54 comprises a central body 55 hinged to the gripping assembly 50 extending away from the gripping assembly along a direction parallel to the second rotation axis R2. The first gripping head 52 and the second gripping head 53 define respective arms 56 of the fork 54 that are substantially parallel and spaced apart.

The first gripping head 52 and the second gripping head 53 each comprise a gripping portion 52a, 53a configured to retain and release an item A.

The rotational motion of the first 52 and second gripping heads 53 around the respective second rotation axes R2 may be kinematically constrained and coordinated with the rotational motion of the support frame 31 around the first rotation axis R1, or it may be kinematically constrained and coordinated with the rotational motion of the articulation arms 40 around the first articulation axes A1, or it may be obtained with a dedicated electric motor (not illustrated), whose actuation is coordinated with the rotational motion of the support frame 31 around the first rotation axis R1 or with the rotational motion of the articulation arms 40 around the first articulation axes A1.

Each first gripping head 52 and second gripping head 53 comprises a pneumatic member, not illustrated, configured to exert a suction or aspiration action on the gripping portion 52a, 53a aimed at retaining an item A against the gripping head in a controlled manner. Preferably, the pneumatic member comprises an open pneumatic conduit at the gripping portion 52a, 53a and in fluid communication with a suction member. The suction member may for example be located in the baseplate to which the support frame is connected and a plurality of conduits may connect the suction member with the pneumatic members of each of the first 52 and second gripping head 53.

Figure 3:
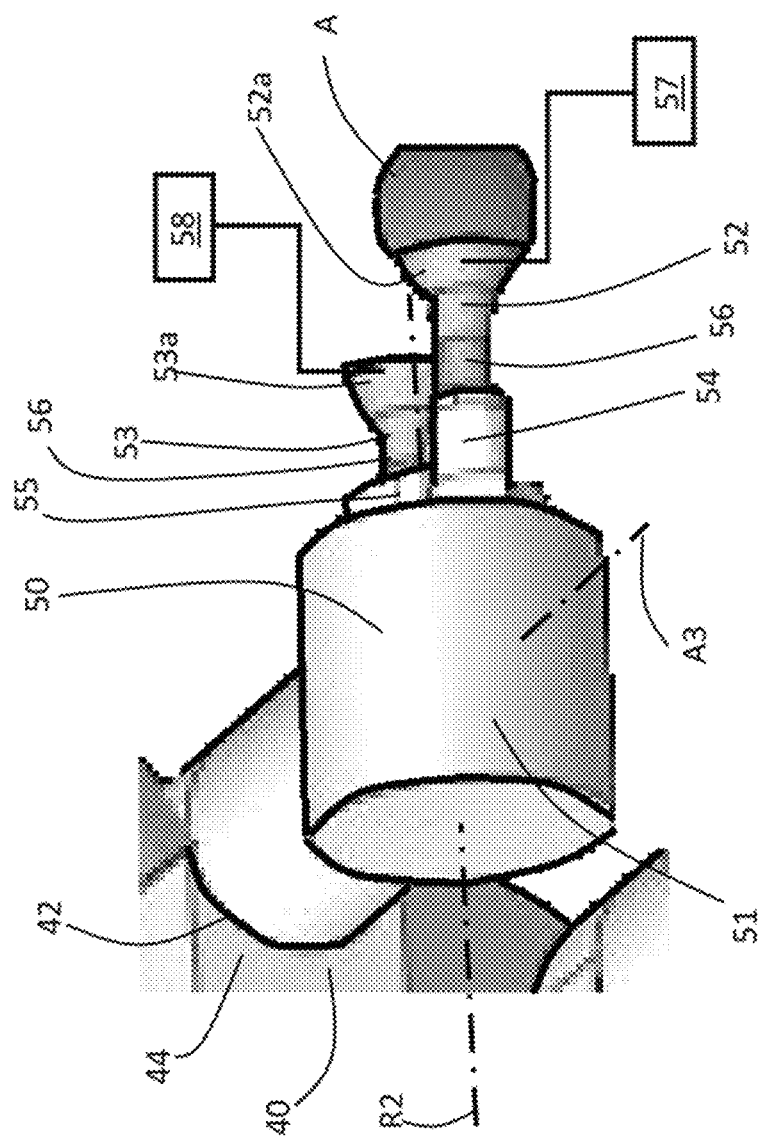
FIG. 3 is a schematic representation of an embodiment detail of the device of FIG. 1.

First activation members 57, schematically illustrated in FIG. 3, of the first gripping heads 52 and second activation members 58, schematically illustrated in FIG. 3, of the second gripping heads 53, control the suction from each first 52 and second gripping head 53. The first 57 and second activation members 58 may, for example, comprise valves arranged so as to selectively interrupt the fluid connection between each pneumatic member and the suction member. The first 57 and second activation members 58 are switchable between a picking condition in which the respective first 52 or second gripping head 53 retains an item A and a release condition in which the respective first 52 or second gripping head 53 does not retain an item A.

The first 52 and second 53 gripping heads can be moved between a picking station 61 and a release station 62.

The first 52 and second gripping heads 53 can be moved along a transport trajectory T, schematically illustrated in FIG. 4, between the picking station 61, arranged at the final station 11a of the first feed member 10 and the release station 62, arranged at the initial station 21a of the second feed member 20.

The transport trajectory T is defined by the combination of the rotation of the support frame 31 around the first rotation axis R1, of the articulation arms 40 and of the gripping assembly assemblies 50 around the first A1, second A2 and third articulation axis A3 and of the first 52 and of the second gripping heads 53 around the second rotation axis R2.

The projection of the transport trajectory T on a plane perpendicular to the first rotation axis R1 comprises an arc-shaped portion T1 which can be obtained by rotating the support frame 31 around the first rotation axis R1 and keeping the articulation arms 40 fixed in a predetermined position with respect to the support frame 31 and the gripping assemblies 50 fixed in a predetermined position with respect to the articulation arms 40.

One or more operating stations 70 configured to perform operations on an item A may be arranged along the arc-shaped portion T1. An operating station 70 may, for example, comprise one or more imaging devices, such as video cameras or cameras. The acquired images can then be processed by a central control unit and compared with reference images. The assessed images detect whether each item A is to be considered as acceptable or unacceptable, by providing downstream of the release station 62 a station for rejecting the items A assessed as not acceptable, for example if the items A have a flat surface or the base is broken or damaged. The rejection station may comprise a pneumatic rejection device, for example including a nozzle capable of removing item A with a blast of compressed air.

The projection of the transport trajectory T on a plane perpendicular to the first rotation axis R1 comprises a substantially straight portion T2 along which the first 52 and second 53 gripping heads move along a straight trajectory. The picking station 61 and the release station 62 are arranged along the substantially straight portion T2 of the transport trajectory T.

Preferably, the substantially straight portion T2 is oriented parallel to a (preferably horizontal) lying plane of the first feed path 11 and/or of the second feed path 21. The substantially straight portion T2 is therefore preferably horizontal and defines the lowest height portion of the trajectory T (i.e. the portion of the trajectory T in which the vertical distance between the first 52 and second 53 gripping heads and the first 11 and/or second 21 feed path is minimal).

The substantially straight portion T2 is obtained by combining the rotation of the support frame 31 around the first rotation axis R1, to rotations of the articulation arms 40 and of the gripping assemblies 50 around the first A1, the second A2 and the third articulation axis A3 so as to synchronise the movements of the first 52 and second gripping heads 53 with the movements of the first 10 and second feed member 20. While travelling the substantially straight portion T2 of the transport trajectory T, the spatial orientation of the first 52 and second gripping heads 53 with respect to the first 10 or second feed member 20 is kept constant. Preferably, the first 52 and second 53 gripping heads are kept vertically oriented and facing downwards during the travel of the substantially straight portion T2.

By way of example, in the illustrated embodiment, considering a given rotation speed of the support frame 31 around the first rotation axis R1 in a first direction of rotation (e.g. anti-clockwise), each first end 41 of the articulation arms 40 moves along an anti-clockwise circumferential trajectory.

By rotating the first connecting rod 43 with respect to the first articulation axis A1 in a first angular direction (e.g. anti-clockwise) while the support frame 31 rotates around the first rotation axis R1 in the same angular direction, the second articulation axis A2 progressively approaches the first rotation axis R1. By simultaneously rotating the second connecting rod along a second angular direction, opposite to the first one, around the second articulation axis A2, the third articulation axis A3 moves following a straight trajectory.

By also simultaneously rotating the gripping assemblies 50 around the third articulation axis A3 in the first angular direction, the spatial orientation of the first 52 and second gripping heads 53 remains constant and the first 52 and second gripping heads 53 move along a straight path.

The projection of the transport trajectory T on a plane perpendicular to the first rotation axis R1 may also comprise joining portions T3 and T4 between the arc-shaped portion T1 and the substantially straight portion T2. In the joining portions T3 and T4, while the support frame 31 rotates around the first rotation axis R1, the articulation arms 40 and the gripping assemblies 50 are brought into predetermined positions with respect to the first A1, the second A2 and the third articulation axis A3 respectively to begin the travel of the substantially straight portion T2 of the transport path T and to end the travel of the substantially straight portion T2 of the transport path T.

The first gripping heads 52 are continuously rotatable in an angular direction around the respective second rotation axes R2. The rotation of the first gripping heads 52 is stopped every 180° so that the first gripping heads 52 rotate between a first and second position and between the second position and the first position. When in the first position, the substantially straight portion T2 of the transport trajectory T travelled by the first gripping heads 52 passes through the picking station 61. When in the second position, the substantially straight portion T2 of the transport trajectory T travelled by the first gripping heads 52 passes through the release station 62.

The second gripping heads 53 are rotatable continuously, and in the same angular direction as the first gripping heads 52, around the respective second rotation axes R2. The rotation of the second gripping heads 53 is stopped every 180° so that the second gripping heads 53 rotate between a third and a fourth position. When in the third position, the substantially straight portion T2 of the transport trajectory T travelled by the second gripping heads 53 passes through the release station 62. When in the fourth position, the substantially straight portion T2 of the transport trajectory T travelled by the second gripping heads 53 passes through the picking station 61.

Each second gripping head 53 and first gripping head 52 of a given gripping assembly 50 rotate simultaneously, such that the second gripping head 53 is arranged in the third position when the respective first gripping head 52 is arranged in the first position, and such that the second gripping head 53 is arranged in the fourth position when the respective first gripping head 52 is arranged in the respective second position. Preferably, for a given gripping assembly 50 and relative to the respective second rotation axis R2, the third position of the second gripping head 53 coincides with the second position of the first gripping head 52 and the fourth position of the second gripping head 53 coincides with the first position of the first gripping head 52.

In other words, rotating the first 52 and second gripping head 53 of a given gripping assembly by 180° allows the positions of the first 52 and second gripping head 53 to be swapped.

The rotation of the first gripping heads 52 and of the second gripping heads 53 is actuated by rotating the respective fork-like body 54 by 180°.

To perform operations on items A transported along the manufacturing line, a sequence of items A is fed along the first feed path 11 towards the picking station 61. The resting portions of the items A are resting on the first transport surface 14, in particular each is resting on a first seat 13.

At the picking station 61, a first item A is picked up from the first feed path 11 through a picking portion of the item A using one of the first gripping heads 52. The picking portion is a surface portion of the item which is different from the resting portion described above and preferably opposite to the resting portion.

To pick up the first item A, the first gripping head 52 is placed in the first position at the picking station 61 along the substantially straight portion T2 of the transport trajectory T. The speed along the substantially straight portion T2 of the transport trajectory T of the first gripping head 52 is equal to the speed of the first item A along the first feed path 11. In the illustrated and described embodiment example, this speed of the first item A coincides with the speed of the seat 13 carrying the first item A. The first gripping head 52 is positioned above the first item A and in particular is substantially in contact with the picking portion of the first item A. The first activation members 57 are activated so that the first item A is retained by the first gripping head 52.

Subsequently, in the joining portion T3 of the transport trajectory T, the first item A is distanced from the first transport surface 14. In this step, the first gripping head 52 remains in the first position and moves away from the first transport surface 14.

In this step, the first gripping head 52 is progressively arranged substantially perpendicular to the first rotation axis R1, so that it aligns with a radial direction with respect to the first rotation axis R1.

In the illustrated example this is achieved by rotating the first connecting rod 43 around the first articulation axis A1 in the second angular direction (clockwise in the illustrated example) while the support frame 31 rotates around the first articulation axis R1 in the first angular direction. At the same time, the second connecting rod 44 is rotated in the first angular direction around the second articulation axis A2. In addition, the gripping assembly 50 of the first gripping head 52 is simultaneously rotated around the third articulation axis A3 in the second angular direction.

An exclusively rotary motion around the first rotation axis R1 is then imposed on the first gripping head 52 by locking the gripping assemblies 50 in the configuration reached with respect to the support frame 31.

The first gripping head 52 begins to travel the arc-shaped portion T1 of the transport trajectory T, with the resting portion of the item A distal from the first rotation axis R1 with respect to the gripping portion.

One or more operations are then performed on the first item A, in particular on the resting portion thereof. For example, it is possible to acquire images or films of the resting portion of the item aimed, for example, at identifying, alternatively or in combination, the surface appearance, surface shape, any defects or other.

In the arc-shaped portion T1 of the transport trajectory T, before or after performing the operation on the item, the first gripping head 52 is brought into the second position by rotating it by 180° around the second rotation axis R2. At the same time, the second gripping head 53 (to which no item A is associated) of the same gripping assembly 50 is rotated by 180° around the second rotation axis R2, moving from the third to the fourth position. In other words, the positions of the first gripping head 52 and the second gripping head 53 are swapped by simultaneously rotating them by 180° around the second rotation axis R2. This rotation is preferably actuated while the first gripping head 52 and the second gripping head 53 rotate around the first rotation axis R1.

By continuing the rotation around the first rotation axis R1, the first gripping head 52 reaches the joining portion T4 of the transport trajectory T. The item A is gradually brought closer to the second transport surface 24.

In this step, the first gripping head 52 is progressively placed substantially parallel to the second transport surface 24.

In the illustrated example this is achieved by rotating the first connecting rod 43 around the first articulation axis A1 in the first angular direction (anti-clockwise in the illustrated example) while the support frame 31 rotates around the first rotation axis R1 in the first angular direction. At the same time, the second connecting rod 44 is rotated in the second angular direction around the second articulation axis A2. In addition, the gripping assembly 50 of the first gripping head 52 is simultaneously rotated around the third articulation axis A3 in the first angular direction.

By continuing the rotation around the first rotation axis R1, the first gripping head 52, and with it the item A, resumes following the substantially straight portion T1 of the transport trajectory T up to the release station 62.

The speed along the substantially straight portion T2 of the transport trajectory T of the first gripping head 52 is equal to the advancement speed of the second transport surface 24.

At the release station 62, the item A is deposited on the second transport surface 24 through the resting portion thereof. In particular, the first item A is deposited on a seat 24 of the second feed member 20. The first item A is deposited by releasing it from the first gripping head 52 by deactivating the first activation members 57.

Subsequently, the first item A is distanced from the device 30 along the second feed path 21 and the first gripping head 52 travels again along a rotation of about 350° (without transporting any item) performing the same movements it performs when transporting an item A until it returns to the picking station 61 to pick up a further item A.

When the first gripping head 52 travels the transport trajectory T from the picking station 61 to the release station 62 transporting an item A, the second gripping head 53 of the same gripping assembly 50 travels the transport trajectory T from the release station 62 to the picking station 61 without transporting items A.

When the first gripping head 52 travels the transport trajectory T from the release station 62 to the picking station 61 without transporting any item A, the second gripping head 53 of the same gripping assembly 50 transports a further item A along the transport trajectory T from the picking position 61 to the release position 62 exactly as described with reference to the first item A transported by the first gripping head 52.

In particular, the second gripping head 53 picks up the further item A from the picking station 61 substantially at the same time of releasing the first item A from the first gripping head 52 in the release station 62.

The motion of the items A is thus continuous between the first feed path 11 and the second feed path 21.

The invention claimed is:

1. A method for performing operations on items (A) transported along a manufacturing line comprising:
    feeding a sequence of items (A) along a first feed path with respective resting portions of the items (A) resting on a first transport surface;
    arranging a plurality of gripping assemblies arranged along a circumferential direction and rotatable along said circumferential direction about a common first rotation axis (R1), wherein each gripping assembly comprises a first gripping head and a second gripping head;
    picking up a first item (A) from the first feed path through a picking portion of the item (A) which is different from the resting portion using the first gripping head;
    rotating the first item (A) around the first rotation axis (R1);
    performing at least one operation on the item (A) during the rotation thereof around the first rotation axis (R1);
    swapping positions of the first gripping head and the second gripping head;
    resting the resting portion of the first item (A) on a second transport surface and releasing the first item (A) from the first gripping head;
    picking up a further item (A) from the first feed path through a picking portion of the further item (A) which is different from the resting portion using the second gripping head.

2. The method according to claim 1, wherein releasing the first item (A) from the first gripping head and picking up a further item (A) from the first feed path through a different picking portion from the resting portion using the second gripping head occur simultaneously.

3. The method according to claim 1, wherein between picking up the first item (A) from the first feed path and releasing the first item (A) from the first gripping head, the first item (A) is rotated around the first rotation axis (R1) by an angle between 350° and 360°.

4. The method according to claim 1, comprising distancing the first item (A) from the first transport surface after picking up the first item (A) from the first feed path; swapping the positions of the first gripping head and the second gripping head being actuated after distancing the first item (A) away from the first transport surface and before resting the resting portion of the first item (A) on the second transport surface.

5. The method according to claim 1, wherein rotating the first item (A) around a first rotation axis (R1) comprises moving the first item (A) along a transport trajectory (T) whose projection on a plane perpendicular to the first rotation axis (R1) comprises an arc-shaped portion (T1) and at least one substantially straight portion (T2); said substantially straight portion (T2) being parallel to the second transport surface.

6. The method according to claim 5, wherein resting the resting portion of the first item (A) on the second transport surface and releasing the first item (A) from the first gripping head are actuated when the first item (A) travels said substantially straight portion (T2) of the transport trajectory (T).

7. The method according to claim 1, wherein swapping the positions of the first gripping head and the second gripping head comprises simultaneously rotating the first gripping head and the second gripping head around a second rotation axis (R2) which is different from the first rotation axis (R1).

8. The method according to claim 7, wherein simultaneously rotating the first gripping head and the second gripping head around a second rotation axis (R2) occurs during the rotation of the first item (A) around the first rotation axis (R1).

9. The method according to claim 1, wherein performing at least one operation on the item (A) during the rotation thereof around the first rotation axis (R1) comprises performing at least one operation on the resting portion of the item (A).

10. The method according to claim 1, wherein performing an operation on the item (A) comprises performing a visual inspection of the surface of the resting portion of the item (A).

11. A device for performing operations on items transported along a manufacturing line comprising:
    a picking station and a release station;
    a plurality of gripping assemblies arranged along a circumferential direction and rotatable along said circumferential direction around a common first rotation axis (R1);
    wherein each gripping assembly comprises a first gripping head and a second gripping head each configured to pick up a respective item (A) from the picking station and to release a respective item (A) in the release station;
    wherein the first gripping head is rotatable about the first rotation axis (R1) between the picking station and the release station and between the release station and the picking station, and wherein the second gripping head is rotatable about the first rotation axis (R1) between the picking station and the release station and between the release station and the picking station;
    wherein when the first gripping head is in the picking station the second gripping head is in the release station and wherein when the first gripping head is in the release station the second gripping head is in the picking station.

12. The device according to claim 11, wherein each first gripping head and each second gripping head are movably mounted on the respective gripping assembly to exchange a position of the first gripping head with the second gripping head and a position of the second gripping head with the first gripping head during the rotation of the gripping assembly around the first rotation axis (R1).

13. The device according to claim 11, wherein when the first gripping head is in the picking station, the first gripping head is placed at a first distance from the second gripping head along a direction parallel to the first rotation axis (R1), and wherein when the second gripping head is in the picking station, the first gripping head is placed at said first distance from the second gripping head along a direction parallel to the first rotation axis (R1).

14. The device according to claim 11, wherein for a 360° rotation of a gripping assembly around the first rotation axis (R1), the first gripping head moves between the picking station and the release station and the second gripping head moves between the release station and the picking station, or the first gripping head moves between the release station and the picking station and the second gripping head moves between the picking station and the release station.

15. The device according to claim 11, comprising first activation members of the first gripping head and second activation members of the second gripping head, wherein the first activation members are switchable between a picking condition in which the first gripping head retains an item (A) and a release condition in which the first gripping head does not retain an item (A), and wherein the second gripping members are switchable between a picking condition in which the second gripping head retains an item (A) and a release condition in which the second gripping head does not retain an item (A).

16. The device according to claim 11, wherein each first gripping head and each second gripping head move along a transport trajectory (T) whose projection on a plane perpendicular to the first rotation axis (R1) comprises an arc-shaped portion (T1) and at least one substantially straight portion (T2); said picking station and said release station being located along said substantially straight portion (T2) of the transport trajectory (T).

17. The device according to claim 11, comprising a support frame rotatable around said first rotation axis (R1); said gripping assemblies being mounted on said support frame to rotate around said first rotation axis (R1).

18. The device according to claim 16, comprising an articulation arm for each gripping assembly, each articulation arm having a first end hinged to a support frame around a first articulation axis (A1) parallel to said first rotation axis (R1) and a second end hinged to said gripping assembly around a third articulation axis (A3) parallel to said first articulation axis (A1); said articulation arm rotating in a first angular direction with respect to said support frame, and said gripping assembly rotating in a second angular direction, opposite to said first angular direction, with respect to said articulation arm, in order to realize said substantially straight portion (T2) of the transport trajectory (T) of said first gripping head and of said second gripping head.

19. The device according to claim 12, wherein each first gripping head and each second gripping head are rotatably mounted, around a second rotation axis (R2) different from to the first rotation axis (R1), on the respective gripping assembly.

20. The device according to claim 11, comprising at least one operating station configured to perform at least one operation on an item (A) transported by the first gripping head and the second gripping head; said at least one operating station being located between the picking station and the release station.

21. The device according to claim 20, wherein said operating station comprises one or more imaging devices.

* * * * *